United States Patent [19]

Tessler

[11] 4,093,798

[45] June 6, 1978

[54] METHOD FOR PREPARING STARCH SULFATE ESTERS

[75] Inventor: Martin M. Tessler, Edison, N.J.

[73] Assignee: National Starch and Chemical Corporation, Bridgewater, N.J.

[21] Appl. No.: 747,895

[22] Filed: Dec. 6, 1976

[51] Int. Cl.$^2$ .............................................. C08B 31/02
[52] U.S. Cl. ...................................... 536/48; 536/107
[58] Field of Search ................................. 536/48, 107

[56] References Cited

U.S. PATENT DOCUMENTS

| | | | |
|---|---|---|---|
| Re. 28,809 | 5/1976 | Tessler | 536/107 |
| 3,720,663 | 3/1973 | Tessler | 536/107 |

Primary Examiner—Melvyn I. Marquis
Attorney, Agent, or Firm—Edwin Szala; Ellen T. Dec

[57] ABSTRACT

Aqueous slurries or dispersions of starch are reacted with selected N-alkylimidazole-N'-sulfonates under specific reaction conditions to yield starch sulfate esters. The organic by-products produced in the reaction are readily removed by washing or dialysis.

8 Claims, No Drawings

METHOD FOR PREPARING STARCH SULFATE ESTERS

BACKGROUND OF THE INVENTION

This invention relates to a novel method for preparing starch sulfate esters. More particularly, this invention relates to a method for preparing starch sulfate esters in water by the reaction of selected N-alkylimidazole-N'-sulfonates with a starch base under specified reaction conditions.

The modification of starch by chemical derivatization is well known and documented in such sources as "Starch and Its Derivatives", by J. S. Radley (1968) Fourth Edition, published by Chapman and Hall, Ltd., London. More particularly, the prior art teaches the preparation of starch sulfate esters in water by the reaction of starch with organic sulfating agents (U.S. Pat. Nos. 2,786,833 and 2,967,178) and, more recently, with inorganic sulfating agents (copending Patent Application to M. Tessler, Ser. No. 660,911 filed Feb. 24, 1976). The use of organic sulfating agents of the prior art, and in particular trimethylaminesulfur trioxide complex, to produce starch sulfate esters results in the production of organic by-products (e.g. trimethylamine) which are very difficult to remove properly from the final starch ester.

It is accordingly an object of the present invention to provide an improved method for preparing starch sulfate esters in water using organic sulfating agents. A further object is to provide a method for preparing starch sulfate esters in water which results in the production of organic by-products which are readily removed from the final starch ester. These and other objects will be apparent from the following description.

SUMMARY OF THE INVENTION

The above and related objects are accomplished by reacting selected N-alkylimidazole-N'-sulfonates with a starch base under controlled conditions in an aqueous, alkaline medium.

The resulting starch sulfate esters, which upon purification are substantially free of any detectable amine odors, are characterized by their greater stability (ability to form cooked pastes which are more resistant to gelling upon cooling), their improved clarity in the cooks, their ability to form highly hydrophilic sols, and their lower gelatinization temperatures as compared to the corresponding untreated starches. These properties enable the starch esters to be employed in a variety of applications, including their use as water retention agents in oil well drilling muds and in various hydraulic cements, and as sizing agents, coatings, thickeners for foods, adhesives, etc., as well as all other known uses for starch sulfate esters, depending upon their degree of substitution.

DESCRIPTION OF THE PREFERRED EMBODIMENTS

The starch bases which may be used in preparing the starch sulfate esters according to the present invention may be derived from any plant source including corn, potato, sweet potato, wheat, rice, sago, tapioca, waxy maize, sorghum, high amylose corn, and the like. Also included are the conversion products derived from any of the latter bases including, for example, dextrines prepared by the hydrolytic action of acid and/or heat; oxidized starches prepared by treatment with oxidants such as sodium hypochlorite; derivatized starches such as starch ethers and esters; and fluidity or thin boiling starches prepared by enzyme conversion or by mild acid hydrolysis. The use of the term "starch base" is thus seen to include any amylaceous substance whether untreated or chemically modified, which, however, still retains free hydroxyl groups capable of entering into the esterification reaction of this invention. If the desired product is to be granular starch, then obviously the initial starting material must be in granular form. It is to be noted, however, that the method of this invention may also be carried out employing gelatinized starches which will result in the production of non-granular starch esters.

For purposes of this invention the term "N-alkylimidazole-N'-sulfonates" refers to compounds useful as the sulfating agents herein corresponding to the general formula:

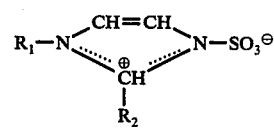

wherein $R_1$ is selected from the group consisting of lower alkyl ($C_1$ to $C_4$) and $R_2$ is selected from the group consisting of lower alkyl and hydrogen. The preferred sulfating agents of this invention are 1,2-dimethylimidazole-3-sulfonate and N-methylimidazole-N'-sulfonate.

The preparation of the N-alkylimidazole-N'-sulfonate sulfating agents as above defined is generally carried out by reacting chlorosulfonic acid with an unsubstituted or substituted N-alkylimidazole.

The basic procedure for preparing the sulfating agent involves adding chlorosulfonic acid slowly with stirring to a solution of the desired imidazole in an inert organic solvent, e.g., carbon tetrachloride, while maintaining the temperature between about 0 and 10° C. The reaction mixture is protected from moisture at all times. After addition is complete, the reaction mixture is stirred for about one hour at room temperature. Thereafter, the solvent is decanted (or removed by filtration) from the insoluble product, which is subsequently stored in a desiccator. A discussion of the preparation and characterization of N-methylimidazole-N'-sulfonate is given in J.A.C.S., 90, 6192 (1968) by D. F. Mayers and E. T. Kaiser.

The method of this invention comprises reacting the N-alkylimidazole-N'-sulfonate with a starch base which is suspended or dispersed in water. The reaction is conducted at temperatures ranging from about 15 to 90° C. The preferred temperature at which a granular starch esterification is carried out is from 35 – 55° C. and that for a non-granular starch esterification is from 35 – 75° C. It will be recognized by the practitioner that use of temperatures above about 60° C. with granular starches will result in granular swelling and filtration difficulties or possibly gelatinization of the starch.

The pH of the reaction mixture is controlled so as to be between 11.2 and 13.0, with the preferred range being about 11.5 to 12.5. The pH is conveniently controlled by the periodic addition of a dilute aqueous solution of sodium hydroxide, but other common bases, such as potassium hydroxide, sodium and potassium carbonate, tetramethylammonium hydroxide, and the like, may be employed with equal success. In a variation of the described method the pH of the reaction mixture is not controlled but rather an excess of the base is added initially to maintain the required alkaline pH.

It is preferred when granular starches are employed to carry out the reaction in the presence of sodium sulfate in amounts of from about 15 to 50% by weight of dry starch. The presence of sodium sulfate acts to suppress swelling of the starch and gives a product which is more easily filterable.

The amount of N-alkylimidazole-N'-sulfonate to be used in the reaction with the starch base may vary from about 1 to 100% by weight, based on the weight of dry starch, depending on such factors as the starch base employed, the degree of substitution or stabilization desired in the end product, and the particular sulfating agent utilized. With granular starches the preferred amount ranges from about 5 to 25% based on the weight of dry starch. The preferred amount of sulfating agent for non-granular starches is from about 20 to 80%, based on the weight of dry starch.

Reaction time will vary from about 1 to 20 hours depending on such factors as the reactivity and amount of sulfating agent used, the temperature and pH employed, etc. After completion of the reaction, the pH of the reaction mixture is preferably adjusted to a pH of from 3.0 to 7.0 with any common acid such as hydrochloric acid, sulfuric acid, acetic acid, etc. The resulting starch sulfate ester product, if in granular form, is then recovered by filtration, washed free of residual salts with water, and thereafter dried. Alternatively, the washed product may be drum-dried or spray dried, or gelatinized and isolated by alcohol precipitation or freeze drying.

If the starch product is non-granular, it may be purified by dialysis to remove residual salts and isolated by alcohol precipitation, freeze drying, or spray drying.

It can be appreciated by the practitioner that a large number of variations may be effected in reacting the starch base with N-alkylimidazole-N'-sulfonates in accordance with the reaction procedure described above without materially departing from the scope and spirit of the invention. Such variations will be evident to those skilled in the art.

The reaction to produce the starch sulfate esters is illustrated by the following schematic equation wherein StOH represents the starch molecule, N-methylimidazole-N'-sulfonate is used as the sulfating agent, and sodium hydroxide as the base:

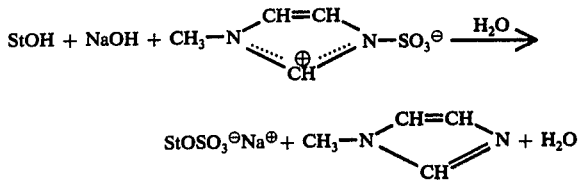

The practitioner will recognize that the starch molecule is a polymer of glucose and contains three free hydroxyl groups per anhydroglucose unit in the polymer. (The non-reducing end glucose units contain four free hydroxyl groups.) Each of these hydroxyl groups can react as described in the equation. It is also known that the relative reactivity of each of the hydroxyl groups is not equivalent, some being more reactive than others, and that many hydroxyl groups from the same starch molecule will react to give the products of this invention.

The starch sulfate esters prepared by the method of this invention are characterized by their increased stability. Thus, the cooked pastes derived from corn starch sulfate ester products display improved clarity and resistance to gelling on cooling. This highly desired property enables the starch esters to be widely utilized as, for example, in the sizing of paper and textiles, and in foods. In addition the starch sulfate esters of the present invention have the ability to form highly hydrophilic sols such that they may be used as water retention agents in oil well drilling muds and in various hydraulic cements. Furthermore, the starch esters of this invention gelatinize at a lower temperature as opposed to untreated starches. This property is of importance in many industrial processes since it permits operation at lower temperatures.

The following examples will illustrate the practice of this invention but are not intended to limit its scope. In these examples, all parts given are by weight and all temperatures in ° C. unless otherwise specified.

EXAMPLE I

This example illustrates the preparation of 1,2-dimethylimidazole-3-sulfonate and the use thereof in preparing the starch sulfate esters in accordance with the method of this invention.

Reagent Preparation

A total of 12.2 parts chlorosulfonic acid was slowly added to a solution of 20.2 parts 1,2-dimethylimidazole in 160 parts carbon tetrachloride with good agitation. The temperature was maintained throughout the addition between 0 and 10° C. using an ice water bath. The reaction mixture and resulting product were protected from moisture at all times. After addition of chlorosulfonic acid was complete, the reaction mixture was stirred at room temperature for about one hour, after which the solvent was decanted from the resulting insoluble product. The 1,2-dimethylimidazole-3-sulfonate thus isolated was sealed in a jar and stored in a desiccator.

Starch Reactions

In preparing the starch derivatives designated as 1 to 10 in Table I, a basic procedure was followed which comprised the suspension of 100 parts of the indicated starch base in 125 to 150 parts water which contained 30.0 parts sodium sulfate and 3.0 parts sodium hydroxide. 1,2-Dimethylimidazole-3-sulfonate was then added in the amount indicated in Table I and the resulting suspension (pH about 12.1) agitated at the desired temperature for the required time. After completion of the reaction, the reaction mixture was acidified to a pH of 6.0 by adding either dilute aqueous sulfuric acid or hydrochloric acid. The starch sulfate ester thus prepared was then recovered by filtration, washed with water to remove residual salts, and air-dried. Substantially no amine (imidazole) odor was detected in an aqueous alkaline suspension of the final purified product, indicating that the by-product was effectively removed in the washing procedure.

In Table I is listed the pertinent data relating to the various starch sulfate esters which were prepared. The effect is seen of varying temperature, time, and the amount of sulfating agent on the sulfur content of the product, which is a direct measure of the extent of reaction.

The procedure used to determine the sulfur content comprised hydrolyzing the purified starch ester by refluxing with hydrochloric acid for 4 hours, cooling and holding at room temperature for 16 hours, filtering, and precipitating sulfate from the boiling filtrate by adding a slight excess of barium chloride solution. The amount of precipitated barium sulfate was determined gravimetrically after washing the precipitate with distilled water until a negative chloride test was obtained with silver nitrate solution.

20% aqueous sodium hydroxide, and 5 parts 1,2-dimethylimidazole-3-sulfonate slowly added. The temperature was maintained between 70 and 80° C. throughout and the pH controlled between 11.8 and 12.6 by adding 20% aqueous sodium hydroxide as required. After addition was complete, the reaction mixture was stirred for 2 hours. At the end of this period the pH was lowered to 6.5 by the addition of 9.5% aqueous hydrochloric acid, and the reaction cooled to room temperature. The starch product thus obtained was purified by dialysis (until a negative sulfate test was obtained in the dialyzate) and isolated by freeze drying. On analysis the

TABLE I

| Derivative Number | Starch Base | % Sulfating Agent on Starch | Temperature (° C.) | Time (hours) | % sulfur, by Weight |
|---|---|---|---|---|---|
| 1 | High amylose corn starch (55% amylose by weight) | 5.0 | 40 | 17 | 0.21 |
| 2 | Corn | 5.0 | 40 | 17 | 0.21 |
| 3 | Corn starch previously treated with 3.0% diethylaminoethyl chloride hydrochloride | 5.0 | 40 | 17 | 0.28 |
| 4 | Waxy maize previously treated with 7.5% propylene oxide and 0.022% phosphorus oxychloride | 5.0 | 40 | 17 | 0.22 |
| 5 | Corn | 5.0 | 40 | 7 | 0.12 |
| 6 | Corn | 5.0 | 40 | 4.5 | 0.13 |
| 7 | Corn | 5.0 | 40 | 2 | 0.11 |
| 8 | Corn | 5.0 | 10-15 | 7.5 | 0.02 |
| 9 | Corn | 1.0 | 40 | 16 | 0.04 |
| 10 | Tapioca | 4.0 | 40 | 17 | 0.14 |

EXAMPLE II

This example illustrates the preparation of additional starch sulfate esters in accordance with this invention employing varied reaction pH's.

Sample A: A total of 40.0 parts corn starch was added to a solution of 1.2 parts sodium hydroxide and 12.0 parts sodium sulfate in 50 parts water. The resulting mixture was agitated at 40° C. and the pH lowered to 11.8 by adding 10.0% aqueous hydrochloric acid. To this mixture was added slowly 2.0 parts 1,2-dimethylimidazole-3-sulfonate while controlling the pH at 11.8 by periodic addition of 3.0% aqueous sodium hydroxide. The mixture was agitated for 18 hours at pH 11.8 and cooled to room temperature. At the end of the reaction, the pH was lowered to 6.0 with 10.0% aqueous hydrochloric acid, the starch product recovered by filtration, washed with water, and dried. Upon analysis the resulting starch sulfate ester was found to contain 0.07% sulfur, by weight.

Sample B: The procedural steps of A above were repeated except that the sodium hydroxide initially present was reduced to 0.32 parts, the sodium sulfate was omitted, and the reaction pH was lowered to 11.6. The resulting starch sulfate ester was found to contain 0.11% sulfur, by weight.

Sample C: The procedural steps of B above were repeated except that the reaction pH was lowered to 11.2. The resulting starch sulfate ester was found to contain 0.02% sulfur, by weight.

EXAMPLE III

This example illustrates the preparation of non-granular starch sulfate esters at two different temperatures, according to the method of this invention.

Sample A: A total of 30.0 parts waxy maize starch which had been acid-hydrolyzed to a degree known in the trade as 85 fluidity was suspended in 120 parts water. The suspension was then heated in a boiling water bath for about 20 minutes and subsequently cooled to 75° C. The reaction pH was then raised to 11.9 with starch sulfate ester was found to contain 0.29% sulfur, by weight.

Sample B: The procedural steps of A above were repeated except that the temperature was lowered to 40° C., the reaction time increased to 17 hours, and the amount of 1,2-dimethylimidazole-3-sulfonate increased to 22.5 parts. The resulting starch sulfate ester was found to contain 1.30% sulfur, by weight.

EXAMPLE IV

This example illustrates the preparation of two additional N-alkylimidazole-N'-sulfonates and the use thereof in preparing the starch sulfate esters of this invention.

Reagent Preparation

N-Propylimidazole-N'-sulfonate

A total of 22.0 parts N-propylimidazole was dissolved in 160 parts carbon tetrachloride and the resulting solution cooled to about 5° C. To the stirring solution was slowly added 11.6 parts chlorosulfonic acid while maintaining the temperature at about 5° C. throughout the addition and protecting the reaction mixture from moisture. After addition was complete, the reaction was stirred at room temperature for about one hour, after which the solvent was decanted from the resultant insoluble N-propylimidazole-N'-sulfonate.

N-Methylimidazole-N'-sulfonate

This compound was prepared by repeating the above procedure except that 16.4 parts N-methylimidazole was used herein in place of 22.0 parts N-propylimidazole.

Starch Reactions

Sample A: A total of 40.0 parts corn starch was added to a solution of 1.2 parts sodium hydroxide and 12.0 parts sodium sulfate in 50 parts water. To this was added 1.2 parts N-propylimidazole-N'-sulfonate, and the resulting mixture was agitated at 40° C. for 17 hours. After completion of the reaction, the mixture was acidified to a pH of 5.0 by adding 9.5% aqueous hydrochloric acid. The starch product was then recovered by filtration, washed with water, and dried. The resulting starch sulfate ester was found to contain 0.05% sulfur, by weight.

Sample B: The procedural steps of A above were repeated except that the amount of N-propylimidazole-N'-sulfonate was increased from 1.2 to 2.0 parts. The resulting starch sulfate ester was found to contain 0.08% sulfur, by weight.

Sample C: The procedural steps of A above were repeated except that 1.6 parts N-methylimidazole-N'-sulfonate was used herein in place of the N-propylimidazole-N'-sulfonate. The resulting starch sulfate ester was found to contain 0.06% sulfur, by weight.

Sample D: A total of 50.0 parts corn starch was added to a solution of 1.5 parts sodium hydroxide and 15.0 parts sodium sulfate in 65 parts water. To this was added 12.5 parts N-methylimidazole-N'-sulfonate while controlling the pH at about 11.5 with 3.0% aqueous sodium hydroxide. After addition was complete and the pH constant, the mixture was agitated at 40° C. for 18 hours. At the end of the reaction, the mixture was acidified to a pH of 5.0 by addition of dilute aqueous hydrochloric acid. The starch product was recovered by filtration, washed with water, and dried. On analysis the resulting starch sulfate ester was found to contain 0.29% sulfur, by weight.

Summarizing, this invention is seen to provide an improved method for preparing starch sulfate esters in an aqueous medium with N-alkylimidazole-N'-sulfonates being employed as the sulfating agents therein. Variations may be made in materials, proportions and procedures without departing from the scope of this invention as defined by the following claims.

I claim:

1. A method for preparing sulfate esters of starch comprising the steps of:
   a. reacting a starch base having free reactive hydroxyl groups with a sulfating agent selected from the group of N-alkylimidazole-N'-sulfonates corresponding to the general formula:

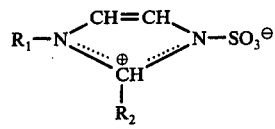

wherein $R_1$ is selected from the group consisting of lower alkyl and $R_2$ is selected from the group consisting of lower alkyl and hydrogen, said reaction being conducted in an aqueous medium at a pH of 11.2 to 13.0 and at a temperature of about 15 to 90° C. for a period of about 1 to 20 hours, the amount of said sulfating agent employed being from about 1 to 100%, based on the weight of dry starch; and
   b. isolating the resultant starch sulfate ester.

2. A method according to claim 1 wherein said reaction is conducted at a pH of about 11.5 to 12.5.

3. A method according to claim 2 wherein said starch base is in granular form, said reaction conducted at a temperature of from 35 to 55° C., and the amount of said sulfating agent employed being from about 5 to 25%, based on the weight of dry starch.

4. A method according to claim 2 wherein said starch base is in non-granular form, said reaction conducted at a temperature of 35 to 75° C., and the amount of said sulfating agent being from about 20 to 80%, based on the weight of dry starch.

5. A method according to claim 1 wherein said starch base is corn starch or waxy maize starch.

6. A method according to claim 1 wherein said sulfating agent is selected from the group consisting of N-methylimidazole-N'-sulfonate and 1,2-dimethylimidazole-3-sulfonate.

7. A method according to claim 1 wherein there is additionally present in the reaction mixture from about 15 to 50%, by weight of dry starch, of sodium sulfate.

8. A method according to claim 1 wherein the reaction mixture is adjusted to a pH of from 3.0 to 7.0 after completion of the reaction of step (a) and before step (b).

* * * * *